US012798587B2

(12) United States Patent
Han

(10) Patent No.: US 12,798,587 B2
(45) Date of Patent: Nov. 17, 2026

(54) SYSTEM FOR PERSONALIZING ACCELERATION OF VEHICLES

(71) Applicants: Hyundai Motor Company, Seoul (KR); Kia Corporation, Seoul (KR)

(72) Inventor: Wook Hyun Han, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/248,045

(22) Filed: Jun. 24, 2025

(65) Prior Publication Data

US 2026/0138614 A1 May 21, 2026

(30) Foreign Application Priority Data

Nov. 15, 2024 (KR) ........................ 10-2024-0162573

(51) Int. Cl.
*B60W 30/188* (2012.01)
*B60W 50/14* (2020.01)

(52) U.S. Cl.
CPC .......... *B60W 30/188* (2013.01); *B60W 50/14* (2013.01); *B60W 2540/043* (2020.02); *B60W 2556/45* (2020.02); *B60W 2720/106* (2013.01)

(58) Field of Classification Search
CPC ............... B60W 30/188; B60W 50/14; B60W 2540/043; B60W 2556/45; B60W 2720/106; B60W 2520/10; B60W 2520/105; B60W 2540/10; B60W 40/09; B60W 2540/30; B60L 15/10; B60L 3/12; B60L 2240/12; B60L 2240/64; B60L 2250/18; B60L 2250/26; B60Y 2200/91
See application file for complete search history.

(56) References Cited

U.S. PATENT DOCUMENTS

| | | | | |
|---|---|---|---|---|
| 11,524,577 | B2 * | 12/2022 | Mizukami | B60K 26/021 |
| 12,269,471 | B2 * | 4/2025 | Kim | B60W 30/143 |
| 2018/0094721 | A1 * | 4/2018 | Lee | F16H 59/52 |
| 2023/0047354 | A1 * | 2/2023 | Wang | B60W 50/0097 |
| 2024/0288381 | A1 * | 8/2024 | Stowell | H01Q 13/20 |
| 2024/0317246 | A1 * | 9/2024 | Choi | B60W 50/038 |
| 2026/0116205 | A1 * | 4/2026 | Han | B60L 7/18 |

* cited by examiner

*Primary Examiner* — Donald J Wallace
*Assistant Examiner* — Jalal C Coduroglu
(74) *Attorney, Agent, or Firm* — MORGAN, LEWIS & BOCKIUS LLP

(57) ABSTRACT

A system for personalizing acceleration of vehicles, includes a driving information detection unit disposed in each vehicle, a controller of each vehicle configured to output driving data of each vehicle obtained based on information collected while driving, including vehicle driving information detected by the driving information detection unit, a communication unit disposed in each vehicle, and a central server configured to determine a driver who is using an excessive level of acceleration energy of a vehicle, based on the driving data of the vehicles, received from each vehicle through the communication unit, generate information to perform acceleration personalization of the vehicle of the determined driver, and transmit the information to the vehicle of the determined driver, wherein the controller in the vehicle of the determined driver tunes accelerating characteristics of the vehicle to perform the acceleration personalization, based on the information to perform the acceleration personalization.

20 Claims, 4 Drawing Sheets

SYSTEM FOR PERSONALIZING ACCELERATION OF VEHICLES

CROSS-REFERENCE TO RELATED APPLICATION

The present application claims priority to Korean Patent Application No. 10-2024-0162573 filed on Nov. 15, 2024, the entire contents of which is incorporated herein for all purposes by this reference.

BACKGROUND OF THE PRESENT DISCLOSURE

Field of the Present Disclosure

The present disclosure relates to a system which may perform driver-customized acceleration control and acceleration personalization based on driving data of a vehicle to improve energy efficiency of the vehicle and achieve safe driving.

Description of Related Art

In general, among energy consumed when a vehicle is driven, the proportion of energy consumed for vehicle acceleration is the largest. Energy consumption due to air resistance, rolling resistance, or gradient resistance that inevitably occurs when driving the vehicle may not be controlled by a driver, but energy consumption for vehicle acceleration may be adjusted by the driver.

The driver must operate an accelerator pedal to accelerate the vehicle, but a vehicle acceleration status, such as changes in vehicle speed and acceleration that occur in response to the actual operation of the accelerator pedal, may vary depending on accelerator pedal sensitivity set in the corresponding vehicle.

Even if the driver operates the accelerator pedal in the same manner, vehicle acceleration characteristics, such as the response degree of the vehicle depending on driver acceleration operation, may vary depending on the accelerator pedal sensitivity setting state of the corresponding vehicle.

Furthermore, the vehicle acceleration characteristics, such as the response degree of the vehicle, may or may not be satisfactory to the driver depending on the accelerator pedal sensitivity set in advance in the corresponding vehicle depending on the driving tendency of the driver. Accordingly, acceleration personalization technology which may set the accelerator pedal sensitivity to be customized for the driver is required.

In general vehicles, a plurality of driving modes, i.e., an economical mode, a general mode (or comfort mode), a power mode (or sports mode), etc., are provided, and the accelerator pedal sensitivity is differentiated and distinguished only depending on the mentioned driving modes.

That is, conventionally, the accelerator pedal sensitivity was fixed and standardized to a predetermined level only for each driving mode, and because it is impossible for each individual driver to set, adjust, and change accelerator pedal sensitivity to reflect his or her acceleration pattern and habits in the driving mode, if the driver continues to operate the accelerator pedal only depending to his or her habits, there would be a disadvantage that the energy efficiency of the vehicle would deteriorate.

As described above, conventionally, the accelerator pedal sensitivity was differentiated and set in advance only for each driving mode, and no acceleration personalization technology that allows the driver to customize the accelerator pedal sensitivity to a desired level for the sake of energy efficiency of the vehicle and safe driving is known.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system which may perform driver-customized acceleration control and acceleration personalization based on driving data of a vehicle.

The objects of the present disclosure are not limited to the above-mentioned objects, and other objects not mentioned herein will be clearly understood by persons of ordinary skill in the art to which the present disclosure pertains (referred to as "those skilled in the art") from the following description.

In one aspect, the present disclosure provides a system for personalizing acceleration of vehicles, including a driving information detection unit disposed in each vehicle, a controller of each vehicle configured to output driving data of each vehicle obtained based on information collected while driving of each vehicle, including vehicle driving information detected by the driving information detection unit, a communication unit disposed in each vehicle, and a central server configured to determine a driver who is using an excessive level of acceleration energy of a vehicle, based on the driving data of the vehicles, received from each vehicle through the communication unit, generate information to perform acceleration personalization of the vehicle of the determined driver who is using the excessive level of the acceleration energy, and transmit the generated information to the vehicle of the driver who is using the excessive level of the acceleration energy, wherein the controller in the vehicle of the driver who is using the excessive level of the acceleration energy tunes accelerating characteristics of the vehicle to perform the acceleration personalization, based on the information to perform the acceleration personalization received from the central server through the communication unit.

In an exemplary embodiment of the present disclosure, the driving data may include vehicle speed information, driver's accelerator pedal input information, and acceleration energy information.

In another exemplary embodiment of the present disclosure, the vehicle speed information may include an average vehicle speed and a standard deviation of vehicle speeds of each vehicle.

In yet another exemplary embodiment of the present disclosure, the driver's accelerator pedal input information may include an accelerator pedal input value peak value average obtained by averaging peak values of driver's accelerator pedal input values.

In yet another exemplary embodiment of the present disclosure, the acceleration energy information may be an acceleration energy ratio defined as a ratio of acceleration energy consumed for vehicle acceleration to total energy consumption while driving of each vehicle.

In still yet another exemplary embodiment of the present disclosure, the total energy consumption may be a sum of air resistance energy consumption defined as energy consumed due to air resistance, rolling resistance energy consumption defined as energy consumed due to rolling resistance, gradient energy consumed due to gradient resistance, the acceleration energy consumed for the vehicle acceleration, and auxiliary machinery energy consumption including energy consumed for air-conditioning, cooling of parts or devices, and operation of electrical parts.

In a further exemplary embodiment of the present disclosure, the driving data may include an acceleration energy ratio defined as a ratio of acceleration energy consumed for vehicle acceleration to total energy consumption while driving of each vehicle, and the controller may be provided to determine the acceleration energy as a value obtained by dividing wheel-based acceleration energy, obtained based on information collected while a driver operates an accelerator pedal while driving of each vehicle, by drivetrain efficiency.

In another further exemplary embodiment of the present disclosure, the controller may be provided to determine the wheel-based acceleration energy as a value obtained by subtracting a sum of air resistance energy consumption, rolling resistance energy consumption, and gradient energy consumed due to air resistance, rolling resistance, and gradient resistance, respectively, while the driver operates the accelerator pedal, from motor driving energy determined while driving of each vehicle.

In yet another further exemplary embodiment of the present disclosure, the acceleration energy information may be an acceleration energy ratio defined as a ratio of acceleration energy consumed for vehicle acceleration to total energy consumption while driving of each vehicle, and the central server may be provided to categorize the vehicles depending on driving routes based on the vehicle speed information, and determine the driver who is using the excessive level of the acceleration energy among vehicle drivers depending on the driving routes using the acceleration energy ratios of the vehicles categorized depending on the driving routes.

In yet another further exemplary embodiment of the present disclosure, the vehicle speed information may include an average vehicle speed and a standard deviation of vehicle speeds of each vehicle.

In still yet another further exemplary embodiment of the present disclosure, the central server may be provided to, in categorizing the vehicles depending on the driving routes, compare the average vehicle speed received from each vehicle with a set reference speed, classify a vehicle whose average speed exceeds the reference speed as a vehicle driving in a high-speed driving section, and classify a vehicle whose average vehicle speed is lower than or equal to the reference vehicle as a vehicle driving in a city.

In a still further exemplary embodiment of the present disclosure, the central server may be provided to determine a relative standard deviation of the vehicle speeds of each vehicle from the average vehicle speed and the standard deviation of the vehicle speeds of each vehicle, and in categorizing the vehicles depending on the driving routes, to further classify vehicles driving in high-speed driving sections as vehicles driving on a plurality of driving routes by comparing the relative standard deviation of the vehicles driving in the high-speed driving sections with a threshold value.

In a yet still further exemplary embodiment of the present disclosure, the driver's accelerator pedal input information may include an accelerator pedal input value peak value average obtained by averaging peak values of driver's accelerator pedal input values, and the central server may be provided to generate a torque correction map as the information for performing the acceleration personalization, based on the acceleration energy ratio of the vehicle of the determined driver who is using the excessive level of the acceleration energy, an average acceleration energy ratio obtained by averaging acceleration energy ratios of vehicles categorized as a driving route to which the driver who is using the excessive level of the acceleration energy belongs, and the accelerator pedal input value peak value average of the driver who is using the excessive level of the acceleration energy.

In another exemplary embodiment of the present disclosure, the torque correction map may be a map configured so that a correlation between the accelerator pedal input values and torque correction rates is defined therein, and the central server may be provided to determine a ratio of the average acceleration energy ratio to the acceleration energy ratio of the vehicle of the driver who is using the excessive level of the acceleration energy as a derating factor, and generate the torque correction map using the determined derating factor and the accelerator pedal input value peak value average.

In yet another exemplary embodiment of the present disclosure, the central server may be provided to, in a coordinate system of the torque correction map, generate a line of a linear function configured to linearly connect two coordinate points having, as coordinate values, a predetermined minimum value of the accelerator pedal input values and a predetermined torque correction rate value corresponding to the minimum value, and a predetermined maximum value of the accelerator pedal input values and a predetermined torque correction rate value corresponding to the maximum value, and generate a line of a quadratic function configured to pass through a coordinate point having, as coordinate values, the accelerator pedal input value peak value average, and a torque correction rate value obtained by multiplying a value of the linear function corresponding to the accelerator pedal input value peak value average by the derating factor, and the two coordinate points connected by the line of the linear function, as the torque correction map.

In yet another exemplary embodiment of the present disclosure, the controller in the vehicle of the driver who is using the excessive level of the acceleration energy may be provided to, in performing the acceleration personalization, tune an accelerator pedal map of the vehicle using the torque correction map received from the central server, and the accelerator pedal map may be a map configured so that a correlation between the accelerator pedal input values and torques is defined therein to determine a driver's demand torque value depending on the accelerator pedal input value.

In still yet another exemplary embodiment of the present disclosure, the controller in the vehicle of the driver who is using the excessive level of the acceleration energy may be provided to, in tuning the accelerator pedal map, correct the torque of the accelerator pedal map corresponding to each accelerator pedal input value before tuning using the torque correction rate of the torque correction map corresponding to each accelerator pedal input value.

In a further exemplary embodiment of the present disclosure, the controller in the vehicle of the driver who is using the excessive level of the acceleration energy may be provided to determine an expected energy efficiency increase rate based on the acceleration energy ratio of the vehicle of the driver who is using the excessive level of the acceleration energy, an average acceleration energy ratio obtained by averaging acceleration energy ratios of vehicles categorized as a driving route to which the driver who is using the excessive level of the acceleration energy belongs, and a regenerative energy ratio of the vehicle of the driver who is using the excessive level of the acceleration energy, and control an input/output unit of the vehicle to display a message configured to recommend performance of the acceleration personalization together with the determined expected energy efficiency increase rate.

In another further exemplary embodiment of the present disclosure, the regenerative energy ratio of the vehicle may be defined as a ratio of regenerative energy generated by a motor to a sum of total energy consumption while driving of the vehicle and the regenerative energy.

In yet another further exemplary embodiment of the present disclosure, the total energy consumption may be a sum of air resistance energy consumption defined as energy consumed due to air resistance, rolling resistance energy consumption defined as energy consumed due to rolling resistance, gradient energy consumed due to gradient resistance, the acceleration energy consumed for the vehicle acceleration, and auxiliary machinery energy consumption including energy consumed for air-conditioning, cooling of parts or devices, and operation of electrical parts.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

Figure 1:
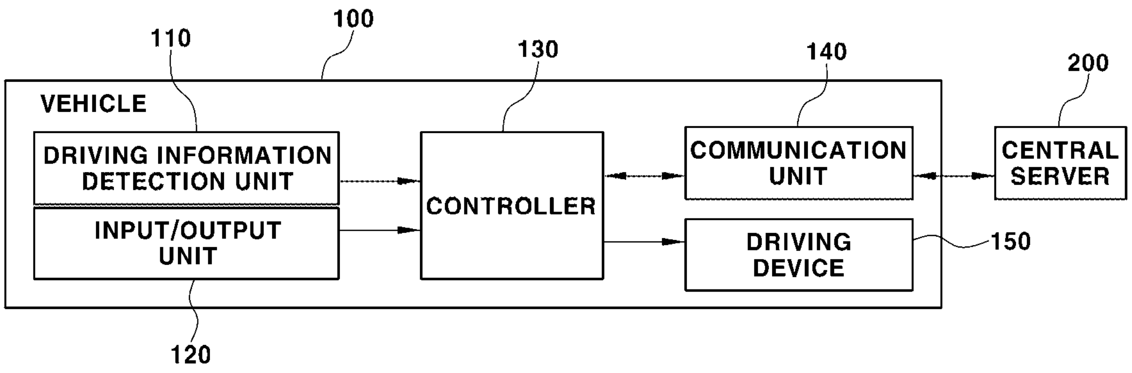
FIG. 1 is a block diagram showing the configuration of a system for personalizing acceleration of vehicles according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, various exemplary embodiments of the present disclosure will be described in detail with reference to the accompanying drawings. Specific structural or functional descriptions set forth in the exemplary embodiments of the present disclosure will be merely exemplarily provided to describe the embodiments depending on the concept of the present disclosure, and the embodiments depending on the concept of the present disclosure may be embodied in different forms. Furthermore, the present disclosure should not be construed as being limited to the embodiments set forth herein, and it will be understood that the present disclosure includes all modifications, equivalents, or substitutes included in the spirit and technical scope of the present disclosure.

In the following description of the embodiments, terms, such as "first" and "second," and the like, are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the following description to refer to the same or like parts. The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, operations, elements, components, and/or combinations thereof, but do not preclude the presence or addition of one or more other features, integers, operations, operations, elements, components, and/or combinations thereof.

The present disclosure is characterized in that a central server collects driving data of vehicles to categorize vehicle drivers depending on driving routes, distinguishes a driver who is using an excessive level of acceleration energy among the drivers categorized depending on the routes, and accelerator pedal sensitivity is customized for the acceleration pattern of the driver so that the driver who is using the excessive level of the acceleration energy utilizes a normal level of acceleration energy.

The present disclosure is useful when applied to commercial vehicles such as buses. In the case of commercial vehicles, because the commercial vehicles mostly drive along the same routes, a traffic volume and high-speed driving sections of the vehicles on each route show a constant pattern. Accordingly, it is easy to categorize vehicles depending on driving routes using driving data, and personalize accelerator pedal sensitivity based on the driving data.

The present disclosure may be applied to vehicles that are provided with a motor as a driving source for driving a vehicle and a driving device for driving the vehicle and are configured for performing regenerative braking by the motor, for example, electric vehicles and fuel cell vehicles.

FIG. 1 is a block diagram showing the configuration of a system for personalizing acceleration of vehicles according to an exemplary embodiment of the present disclosure. As shown in FIG. 1, the system for personalizing acceleration of vehicles, specifically, a system for personalizing accelerator pedal sensitivity, is disposed in each vehicle 100, and includes a driving information detection unit 110, an input/output unit 120, a controller 130, and a communication unit 140.

The driving information detection unit 110 is configured to detect information indicating a vehicle driving state, i.e., vehicle driving information, and may include a vehicle speed detector which is configured to detect a vehicle speed, an acceleration detector which is configured to detect a vehicle longitudinal acceleration, and an accelerator pedal detector which is configured to detect a driver's accelerator pedal input value.

In a general vehicle, the vehicle speed detector may be a wheel speed sensor which is configured to detect a wheel speed, and because the fact that vehicle speed information may be obtained from a signal from the wheel speed sensor is a well-known technical matter in the field of the present disclosure to which the present disclosure pertains, a detailed description thereof will be omitted.

The acceleration detector may be a general longitudinal acceleration sensor (longitudinal G sensor) which is configured to detect a vehicle longitudinal acceleration, and the accelerator pedal detector may be a general accelerator position sensor (APS) which is provided in an accelerator pedal and outputs an electrical signal depending on a driver accelerator pedal operating status.

Accordingly, the vehicle driving information may include the vehicle speed detected by the vehicle speed detector, the vehicle longitudinal acceleration detected by the acceleration detector, and an accelerator pedal input value (APS value, %) detected by the accelerator pedal detector. In an exemplary embodiment of the present disclosure, the vehicle longitudinal acceleration may be used to obtain gradient information of a road on which the vehicle drives.

Furthermore, the driving information detection unit 110 may further include a motor speed detector which is configured to detect a rotation speed of a motor, and the motor speed detector may be a general resolver mounted on the motor. As described below, if the rotation speed of the motor is used to determine a drivetrain efficiency value, the vehicle driving information may further include the rotation speed of the motor detected by the motor speed detector.

The input/output unit 120 in an exemplary embodiment of the present disclosure may include an input device which is provided to input various information required to perform an acceleration personalization mode and control vehicle driving, and a display that displays the various display information required to perform the acceleration personalization mode and control vehicle driving and generated information.

The communication unit 140 is provided to enable the vehicle 100 to communicate with a system outside the vehicle 100, and is connected to the controller 130, and accordingly, the controller 130 of the vehicle 100 may be connected to a central server 200, which is a system outside the vehicle 100, through the communication unit 140 to exchange various information with the central server 200.

The controller 130 is configured to control operation of a driving device 150 that drives the vehicle 100, and the driving device 150 may be the motor configured to drive the vehicle 100. The motor generates and outputs driving force to drive the vehicle 100, and is operated as a generator to perform energy regeneration in which the kinetic energy of the vehicle is recovered as electrical energy, when the vehicle is braking or coasting.

Furthermore, the system for personalizing acceleration of vehicles according to an exemplary embodiment of the present disclosure further includes the central server 200 provided outside each vehicle 100, and the central server 200 collects driving data from a plurality of vehicles 100 having a driving distance that exceeds a set range (e.g., 1,000 km). For the present purpose, the controller 130 of each vehicle 100 may be provided to output the driving data when the driving distance of the vehicle 100 exceeds the set range.

At the present time, each vehicle 100 transmits the driving data to the central server 200 through the communication unit 140, and the driving data of each vehicle 100 may include vehicle speed information, driver's accelerator pedal input information, and acceleration energy and regenerative energy information while driving of the vehicle 100.

That is, the controller 130 of each vehicle 100 obtains the vehicle speed information, the driver's accelerator pedal input information, and the acceleration energy and regenerative energy information based on information collected while driving of the vehicle 100, including the vehicle driving information detected by the driving information detection unit 110, and transmits the obtained information to the central server 200 through the communication unit 140.

In an exemplary embodiment of the present disclosure, the vehicle speed information may include an average vehicle speed and a standard deviation of vehicle speeds of the corresponding vehicle 100, and the driver' accelerator pedal input information may include an accelerator pedal input value peak value average obtained by averaging peak values of driver's accelerator pedal input values (APS values) of the corresponding vehicle.

Furthermore, the controller 130 of each vehicle 100 may transmit, as the acceleration energy and regenerative energy information of the vehicle, a ratio of acceleration energy consumed for vehicle acceleration to energy consumed while driving of the vehicle (i.e., an acceleration energy ratio, %), and a ratio of regenerative energy recovered through energy regeneration by the motor to the energy consumed while driving of the vehicle (i.e., a regenerative energy ratio, %) to the central server 200 through the communication unit 140.

Figure 2:
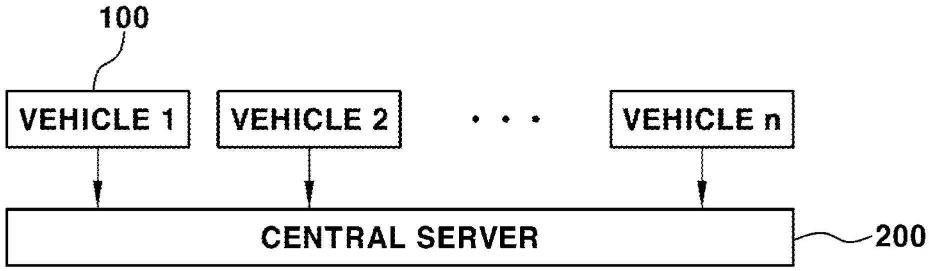
FIG. 2 is a schematic diagram showing that driving data of each vehicle is transmitted from a plurality of vehicles to a central server in an exemplary embodiment of the present disclosure.
Figure 3:
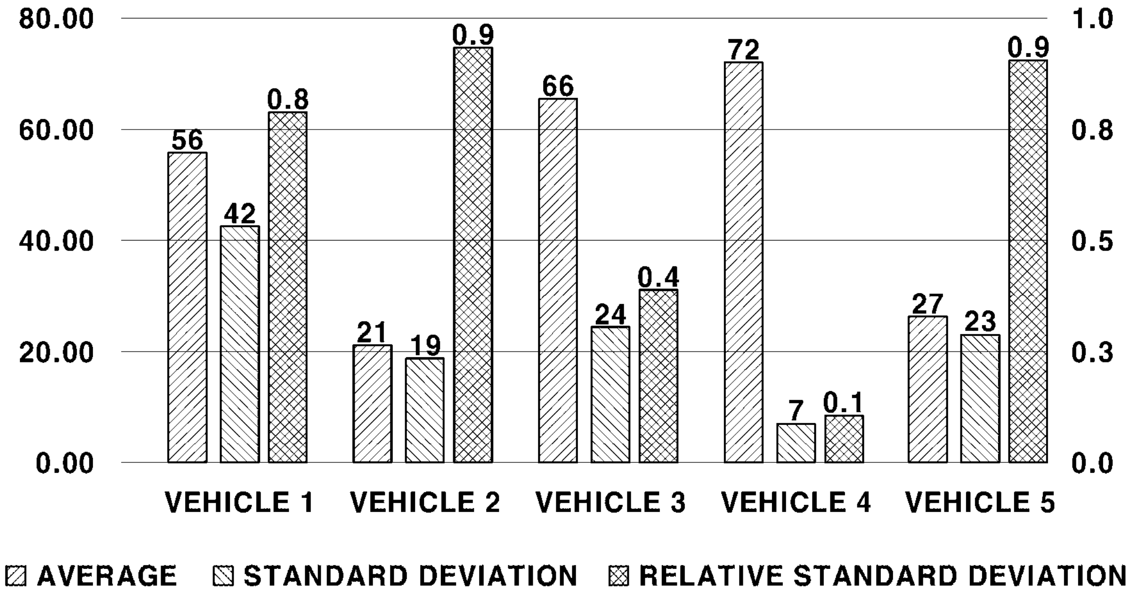
FIG. 3 is a diagram showing an average vehicle speed and a standard deviation of vehicle speeds as vehicle speed information among driving data of each vehicle collected by the central server in an exemplary embodiment of the present disclosure.

FIG. 2 is a schematic diagram showing that driving data of each vehicle 100 is transmitted from the plurality of (n) vehicles 100 to the central server 200 in an exemplary embodiment of the present disclosure, and FIG. 3 is a diagram showing an average vehicle speed and a standard deviation of vehicle speeds as the vehicle speed information among driving data of each vehicle 100 collected by the central server 200 in an exemplary embodiment of the present disclosure. Referring to FIG. 3, a relative standard deviation of the vehicle speeds of each vehicle 100 is also illustrated, and the relative standard deviation of the vehicle speeds is defined as a value obtained by dividing the standard deviation of the vehicle speeds by the average vehicle speed of the vehicle 100.

Figure 4:
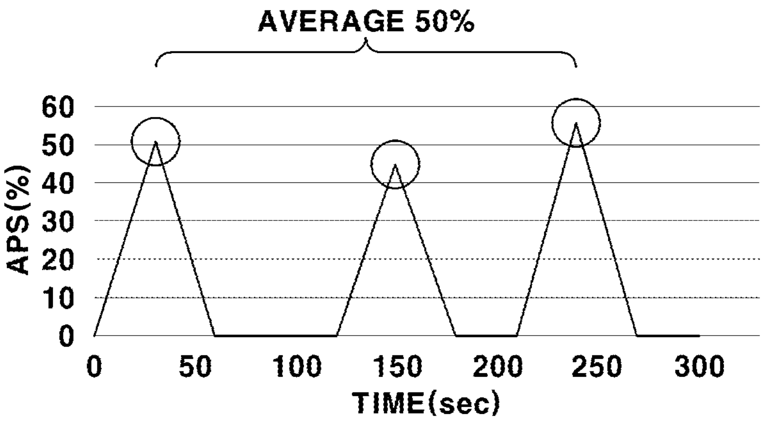
FIG. 4 is a diagram showing peak value of accelerator pedal input values and a peak value average as driver's accelerator pedal input information in an exemplary embodiment of the present disclosure.

FIG. 4 is a diagram showing peak values of accelerator pedal input values and a peak value average as the driver's accelerator pedal input information in an exemplary embodiment of the present disclosure. As illustrated, when the vehicle 100 repeats acceleration and deceleration, peak values of the driver's accelerator pedal input values occur repeatedly as time passes.

Here, each peak value is a maximum accelerator pedal input value in each acceleration section, and an average value (e.g., 50%) of maximum accelerator pedal input values (the peak values of the accelerator pedal input values) in each section is defined as a peak value average of the accelerator pedal input values. While driving of the vehicle, the peak value average information of the accelerator pedal input values is transmitted from each vehicle 100 to the central server 200.

That is, the controller 130 of each vehicle 100 is configured to determine the peak value average of the accelerator pedal input values from the accelerator pedal input values detected by the driving information detection unit 110 while driving of the vehicle, and transmits information on the obtained peak value average of the accelerator pedal input values to the central server 200 through the communication unit 140.

Figure 5:
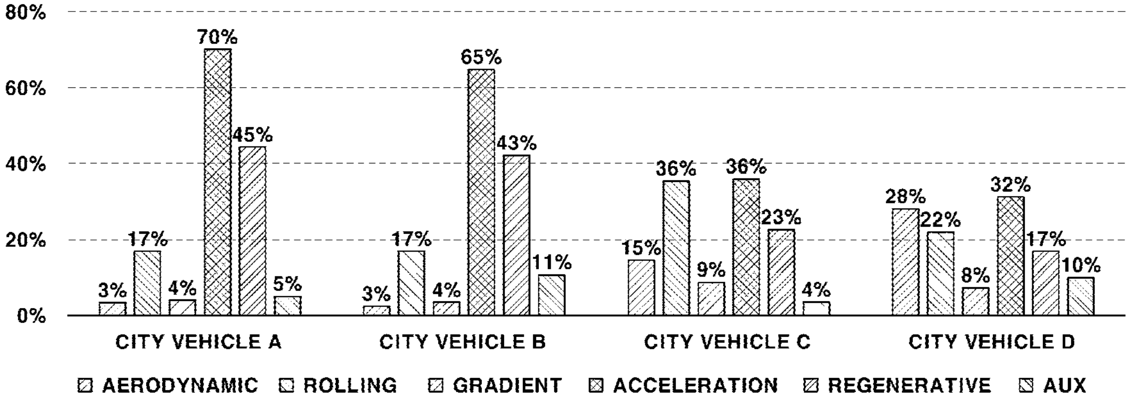
FIG. 5 is a diagrams showing a consumed energy and regenerative energy distribution of each vehicle in an exemplary embodiment of the present disclosure.

FIG. 5 is a diagram showing a consumed energy and regenerative energy distribution of each vehicle in an exemplary embodiment of the present disclosure, and illustrates an energy consumption ratio and a regenerative energy ratio of each vehicle. Referring to this, the regenerative energy ratio ("regenerative", %) determined for each vehicle and an acceleration energy ratio ("acceleration", %) as the energy consumption ratio determined for each vehicle are illustrated as examples.

Furthermore, referring to FIG. 5, an air resistance energy consumption ratio ("aerodynamic", %) of each vehicle, a rolling resistance energy consumption ratio ("rolling", %) of each vehicle, and a gradient energy ratio ("gradient", %) of each vehicle are illustrated as examples. Here, "AUX" indicates an auxiliary machinery energy consumption ratio (%) of each vehicle, including energy consumed for air conditioning, cooling of parts or devices, and operation of electrical parts.

In an exemplary embodiment of the present disclosure, the central server 200 receives the acceleration energy ratio (%) and the regenerative energy ratio (%) determined in each vehicle 100 based on the unique driving resistance of each vehicle type and air conditioning and regenerative braking of each driver. A method of determining the acceleration energy ratio and the regenerative energy ratio will be described in detail later.

Differences in acceleration energy inevitably occur depending on the vehicle driving route and traffic conditions, and if only acceleration energy is compared, it is impossible to set accelerator pedal sensitivity appropriate for each route.

Accordingly, in an exemplary embodiment of the present disclosure, the central server 200 may collect driving data information, such as vehicle speeds for the routes on which vehicles 100 mainly drive, from the vehicles 100 driving on each route, and classify and categorize the vehicles 100 depending on the routes using the collected driving data, thereby being capable of comparing the acceleration energies of the vehicles 100 depending on the routes.

In general, driving energy, which is energy consumed when a vehicle is driven for an arbitrary time, may be determined as the sum of energy consumed due to air resistance (hereinafter referred to as "air resistance energy consumption"), energy consumed due to rolling resistance (hereinafter referred to as "rolling resistance energy consumption"), energy consumed due to gradient resistance (hereinafter referred to as "gradient energy"), acceleration energy, regenerative energy, and auxiliary machinery energy consumption.

The following Mathematical Expression 1 is an expression representing power consumed while driving of the vehicle, and the power consumed may be obtained from power consumed due to driving resistance, power consumed due to gradient resistance, acceleration power, regenerative power, auxiliary machinery power consumption, vehicle speed, and drivetrain efficiency.

Here, the auxiliary machinery power consumption may be defined as the sum of air conditioning power consumption, cooling power consumption, which is power consumed to cool parts or devices, electrical part power consumption (i.e., low voltage DC-DC converter (LDC) power consumption).

The driving energy may be determined by integrating power consumption determined by the following Mathematical Expression 1 over driving time. That is, the driving energy may be determined by integrating a value obtained by the following Mathematical Expression 1 over time.

[Mathematical Expression 1]

$$\text{Power}\times\varepsilon=\left[\frac{1}{2}\left(C_d\cdot\rho\cdot A\cdot V^2\right)+W\cdot\cos\theta(RRC+VRC\cdot V)+W\cdot\sin\theta+\frac{W}{g}\cdot acc-\frac{W}{g}\cdot dec\right]\times V+Aux$$

In the above Mathematical Expression 1, "Power" represents the power consumption, "$C_d$" represents a drag coefficient of the vehicle, "ρ" represent air density, "A" represents a drag area of the vehicle, "V" represents a vehicle speed, "W" represents a vehicle weight, "θ" represent a gradient angle of a road on which the vehicle drives, "RRC" represents rolling resistance, "VRC" represent viscous resistance, "g" represent gravitational acceleration, "acc" represents a vehicle acceleration, "dec" represents a vehicle deceleration, "ε" represents drivetrain efficiency, and "Aux" represents the auxiliary machinery power consumption including the air conditioning power consumption, the cooling power consumption, and the electrical part power consumption.

In the above Mathematical Expression 1, $$\text{“}\frac{1}{2}\left(C_d\cdot\rho\cdot A\cdot V^2\right)\text{”}$$

represents the power consumed due to air resistance (air resistance power consumption), and "W·cos θ (RRC+VRC·V)" represents the power consumed due to rolling resistance (rolling resistance power consumption). Furthermore, "W·sin θ" represents the power consumed due to gradient resistance (gradient resistance power consumption), $$“\frac{W}{g}\cdot acc”$$

represents the acceleration power, and $$“\frac{W}{g}\cdot dec”$$

represents the deceleration power.

In the above Mathematical Expression 1, the sum of the air resistance and the rolling resistance is the driving resistance, and $$“\frac{1}{2}(C_d\cdot\rho\cdot A\cdot V^2)+W\cdot\cos\theta$$

(RRC+VRC·V)", which is the sum of the air resistance power consumption and the rolling resistance power consumption, is driving power $P_{drive}$.

That is, the driving power $$P_{drive}\text{ is }“\frac{1}{2}(C_d\cdot\rho\cdot A\cdot V^2)+W\cdot\cos\theta(RRC+VRC\cdot V)”,$$

and in Mathematical Expression 1, $$“\frac{1}{2}(C_d\cdot\rho\cdot A\cdot V^2)+W\cdot\cos\theta(RRC+VRC\cdot V)+W\cdot\sin\theta+\frac{W}{g}\cdot acc”$$

represents motor driving power. A result obtained by integrating the motor driving power over time is motor driving energy.

The vehicle speed V is real-time detection information detected by the vehicle speed detector, and the gradient angle θ may be obtained from real-time longitudinal acceleration information detected by the acceleration detector (i.e., longitudinal acceleration sensor).

A method of determining the gradient angle (angle of inclination) θ of a road on which the vehicle drives based on a longitudinal acceleration value is a well-known technical matter to those skilled in the art, and a detailed description thereof will thus be omitted.

Furthermore, the vehicle weight may be a predetermined weight or a vehicle weight estimated from the longitudinal acceleration value of the vehicle detected by the acceleration detector. A method of estimating the vehicle weight based on the longitudinal acceleration value is a well-known technical matter to those skilled in the art, and a detailed description thereof will thus be omitted.

The vehicle acceleration acc and the vehicle deceleration dec may be detected by the acceleration detector (longitudinal acceleration sensor), and the electrical part power consumption may be the low voltage DC-DC converter (LDC) power consumption.

The LDC is a DC-DC converter that converts the power of a high-voltage battery (main battery) and supplies the converted power to low-voltage electrical parts in the vehicle, and the LDC power consumption is power consumed by the low-voltage electrical parts through the LDC. It is a well-known fact that the LDC power consumption is determined in real time in a general vehicle.

The drag coefficient $C_d$, which is used to determine the air resistance, the air resistance power consumption, and the driving power including the air resistance power consumption, is also called an air resistance coefficient, and is a unique characteristic value of the vehicle.

Furthermore, the drag area A is a frontal area of the vehicle, and is also a unique characteristic value of the vehicle. As the drag coefficient $C_d$ and the drag area A, which are the unique characteristic values of the vehicle, predetermined values thereof may be used.

The drivetrain efficiency F means the product of reducer efficiency and motor efficiency, and in the instant case, the motor efficiency is motor driving efficiency when the motor is driven, and is motor regeneration efficiency when regeneration occurs by the motor.

Both the motor driving efficiency and the motor regeneration efficiency may be obtained from input voltage and input current of the motor, a motor torque, and a motor rotating speed. The motor driving efficiency may be obtained as the ratio of "driving torque×rotating speed" to "voltage×current", and the motor regeneration efficiency may be obtained as the ratio of "voltage×current" to "regenerative torque×rotating speed".

Here, the current and voltage to determine the motor driving efficiency are current and voltage applied to the motor when the motor is driven, and the current and voltage to determine the motor regeneration efficiency are regenerative current and motor voltage generated during regenerative operation of the motor.

Alternatively, the drivetrain efficiency may be determined as a function of the motor torque and the motor rotating speed. For the present purpose, a two-dimensional table in which the drivetrain efficiency is set as a value depending on the motor torque and the motor rotation speed may be provided in the controller 130.

The controller 130 may be configured to determine a corresponding drivetrain efficiency value from the table by a method, such as interpolation, using the motor torque and the motor rotation speed (which may be a detection value of a sensor, such as a resolver) as inputs.

Furthermore, in an exemplary embodiment of the present disclosure, as will be described later, reducer efficiency to determine acceleration energy is used, and the controller 130 may use a predetermined value (e.g., 87%), i.e., a value set to a specific constant depending on the reducer specifications of the corresponding vehicle 100, as the reducer efficiency.

Furthermore, to determine the driving power, the above equation using the drag coefficient and the drag area, i.e., $$“\frac{1}{2}(C_d\cdot\rho\cdot A\cdot V^2)+W\cdot\cos\theta(RRC+VRC\cdot V)”,$$

may be used, but the driving power may also be determined by a separate equation.

In detail, the power consumed due to driving resistance, i.e., the driving power, may be determined by multiplying the driving resistance (force) F by the vehicle speed V, and here, the driving resistance may be determined as a function of the vehicle speed V instead of using the unique characteristic values of the vehicle 100, such as the drag coefficient $C_d$ and the drag area A.

For example, the driving resistance may be obtained from a quadratic function of the vehicle speed, and this will be expressed as an equation as follows.

$$F(N) = a \times V^2 + b \times V + c \quad \text{[Mathematical Expression 2]}$$

Here, "F" represents driving resistance (N), "a" represents an air resistance coefficient, "b" represents a viscous resistance coefficient, "c" represents a rolling resistance coefficient, and "V" represents a vehicle speed. "a", "b", and "c" may be determined from data measured and collected through preliminary evaluation at the vehicle development stage, and "a", "b", and "c" determined at the vehicle development stage may be input and stored in the controller 130 of a mass-produced vehicle 100 and then used to determine the driving resistance and the driving power from the vehicle speed.

The following Mathematical Expression 3 represents the driving power, and energy consumed due to the driving resistance (hereinafter referred to as "driving resistance energy consumption") is determined by integrating the driving power over time.

$$P_{drive} = F \times V = a \times V^3 + b \times V^2 + c \times V \quad \text{[Mathematical Expression 3]}$$

In Mathematical Expression 3, "$P_{drive}$" represents the driving power (W), "$a \times V^3$" is the power consumed due to air resistance, and "$b \times V^2 + c \times V$" is the power consumed due to rolling resistance. The power consumed due to rolling resistance may be determined as "$(b \times V^2 + c \times V) \times \cos\theta$" to reflect the gradient information of the road on which the vehicle 100 drives, as in Mathematical Expression 1.

In Mathematical Expression 1, which is the equation to determine the power consumed while driving of the vehicle, Mathematical Expression 3 may be used instead of $$\text{“}\frac{1}{2}(C_d \cdot \rho \cdot A \cdot V^2) + W \cdot \cos\theta(RRC + VRC \cdot V)$$

as the driving power, and the driving energy, which is the energy consumed while driving of the vehicle, may be obtained by integrating the present power consumption determination equation over time (driving time).

The method of determining the power consumed while driving of the vehicle and the driving energy in a general vehicle has been described above. In an exemplary embodiment of the present disclosure, the controller 130 is configured to determine wheel-based acceleration energy using the air resistant energy consumption and the rolling resistance energy consumption among the driving energy, the gradient energy, and the motor driving energy, and is configured to determine final acceleration energy from the determined wheel-based acceleration energy.

Among the driving energy, the air resistance energy consumption may be determined by integrating "$a \times V^3$" over time, the rolling resistance energy consumption may be determined by integrating "$(b \times V^2 + c \times V) \times \cos\theta$" over time, and the gradient energy may be determined by integrating "$W \times \sin\theta \times V$" over time.

Furthermore, in an exemplary embodiment of the present disclosure, the motor driving energy may be determined by integrating "motor torque×motor rotating speed×vehicle speed" over time, and at the instant time, the motor torque is a driving torque that has a positive (+) value and is a toque in the positive (+) direction.

Furthermore, the motor regeneration energy may be determined by integrating "motor torque×motor rotating speed×vehicle speed" over time, and at the instant time, the motor torque is a driving torque that has a negative (−) value and is a toque in the negative (−) direction.

Furthermore, in an exemplary embodiment of the present disclosure, the controller 130 may be set to determine the wheel-based acceleration energy using information during operation of the accelerator pedal by a driver, i.e., the air resistance energy consumption, the rolling resistance energy consumption, and the gradient energy during operation of the accelerator pedal, along with the motor driving energy.

The controller 130 may be configured to determine whether the accelerator pedal is operated by the driver from a signal from the accelerator pedal detector, and determine the wheel-based acceleration energy used only for vehicle acceleration using information obtained during operation of the accelerator pedal (while the accelerator pedal is in the ON state), i.e., the motor driving energy, the air resistance energy consumption, the rolling resistance energy consumption, and the gradient energy during operation of the accelerator pedal.

It is not easy to distinguish energy used to accelerate a general vehicle, and acceleration of the vehicle may occur if a driver utilizes an accelerator pedal at his or her own will, but acceleration or deceleration of the vehicle may occur regardless of the accelerator pedal when the vehicle is driving uphill or downhill, and therefore, it is impossible to distinguish the acceleration energy used to accelerate the vehicle based only on the acceleration of the vehicle.

Therefore, in an exemplary embodiment of the present disclosure, to accurately determine the acceleration energy used only for vehicle acceleration regardless of the gradient of the road, such as uphill or downhill, the acceleration energy used only for vehicle acceleration is determined by subtracting the sum of the driving resistance energy consumption (the sum of the air resistance energy consumption and the rolling resistance energy consumption) and the gradient energy during operation of the accelerator pedal from the motor driving energy.

The driving resistance occurs unconditionally while the vehicle moves forward, and therefore, simply subtracting the sum of the driving resistance energy consumption and the gradient energy from the motor driving energy may result in a situation in which excessive energy is deducted.

Accordingly, in an exemplary embodiment of the present disclosure, the driving resistance energy consumption and the gradient energy are divided based on the time of accelerator pedal operation time and other times, and actual acceleration energy used for vehicle acceleration is determined by subtracting the sum of the driving resistance energy consumption and the gradient energy at the time of accelerator pedal operation from the motor driving energy.

The acceleration energy determined as described above is acceleration energy at a vehicle wheel (hereinafter referred to as "wheel-based acceleration energy"), and is converted into acceleration energy at the motor to determine the final acceleration energy, and the final acceleration energy of the vehicle may be determined by dividing the wheel-based acceleration energy by the drivetrain efficiency, which is the product of the reducer efficiency and the motor efficiency.

Meanwhile, when the acceleration energy (final acceleration energy) is determined as described above, the controller 130 is configured to determine the acceleration energy ratio as the ratio (%) of the acceleration energy to the total energy consumption, which is consumed by the vehicle while driving, i.e., assuming that the sum of the air resistance energy consumption, the rolling resistance energy consumption, the gradient energy, the acceleration energy, and the auxiliary machinery energy consumption is 100%.

At the present time, the controller 130 may also determine the regenerative energy ratio, and in the instant case, may determine the regenerative energy ratio as the ratio (%) of the regenerative energy to the sum of the total energy consumption and the regenerative energy, i.e., assuming that the sum of the air resistance energy consumption, the rolling resistance energy consumption, the gradient energy, the acceleration energy, the auxiliary machinery energy consumption, and the regenerative energy is 100%.

In the present way, the regenerative energy ratio is defined as the ratio of energy recovered by the regenerative operation of the motor to 100% of the total energy consumption. For example, if the regenerative energy ratio of the vehicle is 40%, it may be understood that, when the driver of the corresponding vehicle consumes 100% of the total energy to drive the vehicle, 40% of the energy consumption is recovered and only 60% is ultimately used.

Meanwhile, in an exemplary embodiment of the present disclosure, the controller 130 of each vehicle 100 transmits the acceleration energy ratio (%) determined while driving of the vehicle 100 as the acceleration energy information of the vehicle 100 to the central server 200 outside the vehicle 100 through the communication unit 140.

Furthermore, the controller 130 of each vehicle 100 may further transmit the regenerative energy ratio (%) determined while driving of the vehicle 100 as the regenerative energy information of the vehicle 100 to the central server 200 outside the vehicle 100 through the communication unit 140.

Furthermore, the controller 130 of each vehicle 100 transmits the average vehicle speed and standard deviation information of the vehicle speeds as the vehicle speed information to the central server 200, and transmits the peak value average information of the accelerator pedal input values (APS values) as the driver's accelerator pedal input information to the central server 200.

The central server 200 is configured to perform categorization based on vehicle speed data received from the plurality of (n) vehicles 100. First, the central server 200 may classify each vehicle 100 as one of a city vehicle which drives on city roads and a vehicle which drives in high-speed driving sections by comparing the average vehicle speed received from each vehicle 100 with a predetermined reference speed (e.g., 35 km/hr).

At the present time, if the average vehicle speed of a vehicle 100 exceeds the reference speed, the central server 200 classifies the corresponding vehicle 100 as a vehicle which drives in high-speed driving sections, and if the average vehicle speed of a vehicle 100 is lower than or equal to the reference speed, the central server 200 classifies the corresponding vehicle 100 as a city vehicle.

In an exemplary embodiment of the present disclosure, the reference speed may be set to a value obtained by multiplying the maximum speed in cities of each county by a set multiple, and the maximum speed in cities may be a speed limit set on city roads.

Furthermore, the central server 200 may further classify vehicles 100 exceeding the reference speed, i.e., vehicles 100 driving in high-speed driving sections, based on a high-speed ratio using the vehicle speed data received from the corresponding vehicles 100.

In the present process, the central server 200 may be configured to determine the relative standard deviation of the vehicle speeds of each vehicle 100 using the standard deviation of the vehicle speeds and the average vehicle speed of each vehicle 100 as the vehicle speed data. The relative standard deviation of the vehicle speeds of each vehicle 100 is determined as a value obtained by dividing the standard deviation of the vehicle speeds of the corresponding vehicle 100 by the average vehicle of the corresponding vehicle 100.

Thereafter, the central server 200 may classify the vehicles 100 based on the high-speed ratio by comparing the relative standard deviation of the vehicle speeds of each vehicle 100 with a predetermined threshold value, and if the relative standard deviation of the vehicle speeds of a vehicle 100 is less than a predetermined lower threshold value (e.g., 0.3), the central server 200 classifies the corresponding vehicle 100 as a large high-speed ratio vehicle which has a large high-speed ratio.

Furthermore, if the relative standard deviation of the vehicle speeds of a vehicle 100 exceeds a predetermined upper threshold value (e.g., 0.7), the central server 200 classifies the corresponding vehicle 100 as a small high-speed ratio vehicle which has a small high-speed ratio.

Furthermore, if the relative standard deviation of the vehicle speeds of a vehicle 100 is within the range from the lower threshold value to the upper threshold value, the central server 200 classifies the corresponding vehicle 100 as a medium high-speed ratio vehicle which has a medium high-speed ratio.

Even if roads on which the vehicle 100 drives are mainly highways, if most of the roads are classified as chronically congested sections, the roads are similar to a road with a small high-speed ratio. Therefore, in the instant case, the vehicle 100 may be classified as a small high-speed ratio vehicle in which the relative standard deviation exceeds the upper threshold value.

In the present way, in an exemplary embodiment of the present disclosure, the driving routes of the vehicles 100 are categorized depending on actual high-speed driving ratios thereof based on the traffic conditions of the roads, and then the acceleration energies of the vehicles 100 are compared. That is, the central server 200 is configured to perform categorization of the driving routes of the vehicles 100 based on the traffic conditions based on the average vehicle speed and the relative standard deviation of the vehicle speeds of each vehicle 100, and classifies the vehicles driving in high-speed driving sections as large high-speed ratio vehicles, medium high-speed ratio vehicles, and small high-speed ratio vehicles.

As a result, the vehicles 100 may be classified as the city vehicles with average vehicle speeds lower than the reference speed, the large high-speed ratio vehicles, the medium high-speed ratio vehicles, and the small high-speed ratio vehicles. Here, the city vehicles may be classified as the small high-speed ratio vehicles.

An example of classifying vehicles driving in high-speed driving sections as the large high-speed ratio vehicles, the medium high-speed ratio vehicles, and the small high-speed ratio vehicles using the upper and lower threshold values has been described above, but routes on which vehicles mainly drive may be classified as high-speed routes with a large high-speed ratio, metropolitan routes with a small high-speed ratio, and city routes in which an average vehicle speed is lower than or equal to a reference speed using one threshold value (classified as three categories: city/metropolitan/high-speed routes). At the instant time, if even a high-speed route such as a highway is a route with constant congestion, the present high-speed route may be classified as the metropolitan route or the city route.

If vehicles to which the present disclosure is applied are electric buses or fuel cell buses, the above vehicles classified as the city, metropolitan, and high-speed vehicles may be city buses, metropolitan buses, and express buses, respectively.

Next, the central server 200 analyzes and compares the acceleration energy ratios (%) determined and transmitted by the vehicles 100 depending on the driving routes, and extracts vehicles with an acceleration energy ratio exceeding a set level among the vehicles classified as vehicle on each driving route.

At the present time, the central server 200 is configured to determine the averages and standard deviations of the acceleration energy ratios (%) of the vehicles 100 on each driving route (e.g., the city, metropolitan, or high-speed route), and is configured to determine a driver who is using an excessive level of acceleration energy of the vehicle 100 using the determined average and standard deviation.

In the present process, among the acceleration energy ratios (%) of all the vehicles 100 on each route, the acceleration energy ratios (%) that fall within the upper and lower n % (n being a predetermined value) may be excluded, and the average and the standard deviation of the remaining acceleration energy ratios may be determined.

Furthermore, in the process of selecting the driver who is using the excessive level of the acceleration energy, the server 200 may select a driver who utilizes an acceleration energy ratio exceeding an M-sigma (M being a predetermined value, e.g., 1.5, 2, or the like) set from the average as the driver who is using the excessive level of the acceleration energy using the deduced average and standard deviation.

Figure 6:
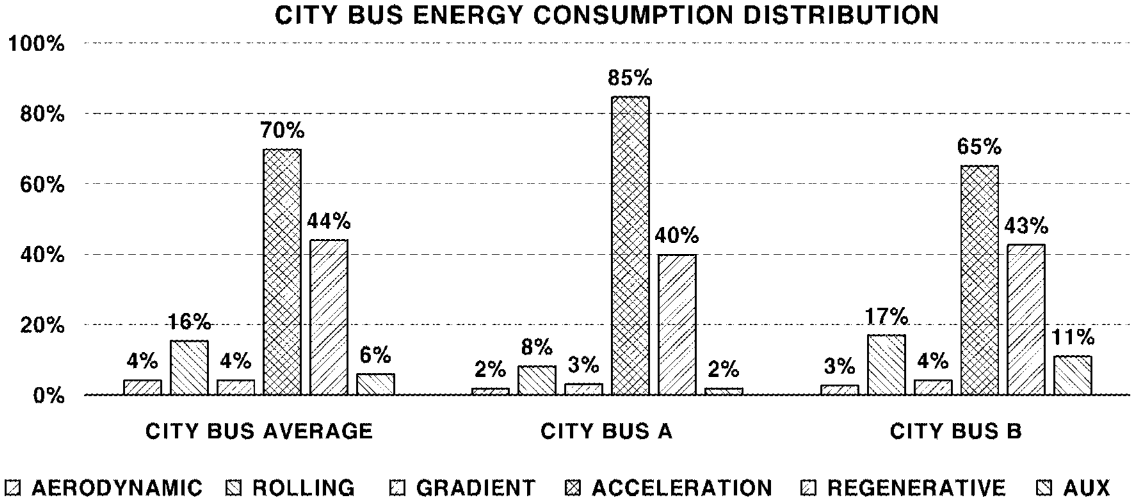
FIG. 6 and FIG. 7 are diagrams showing the results of analyzing the consumed energy and regenerative energy distributions of city buses and metropolitan buses in an exemplary embodiment of the present disclosure.
Figure 7:
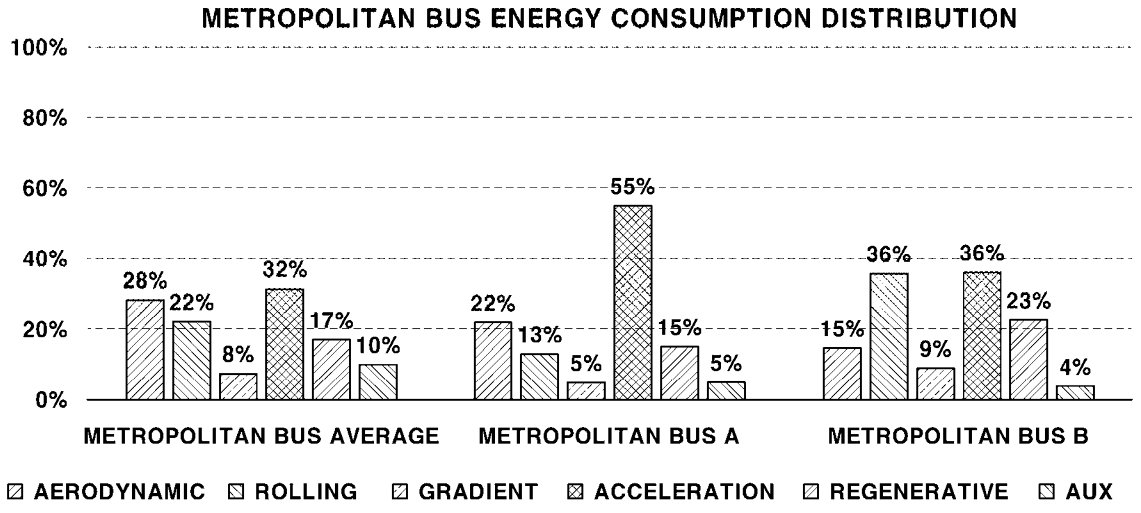

FIG. 6 and FIG. 7 are diagrams showing the results of analyzing the energy consumption distributions of city buses and metropolitan buses in an exemplary embodiment of the present disclosure. Referring to FIG. 6 and FIG. 7, examples of the results of analyzing the energy consumption distributions of a plurality of city buses driving on city routes and a plurality of metropolitan buses driving on metropolitan routes are illustrated.

FIG. 6 illustrates an example of energy consumption ratios (%) of the city buses driving on city routes while driving, and FIG. 7 illustrates an example of energy consumption ratios (%) of the metropolitan buses driving on metropolitan routes while driving.

A city bus may be defined as a bus that mainly drives on city roads within a city, and a metropolitan bus may be defined as a bus that mainly drives and moves on highways or metropolitan roads connecting cities.

As described above, the controller 130 of each vehicle 100 is configured to determine an energy consumption ratio (%) by analyzing the energy consumption distribution of a corresponding vehicle 100, and transmits an acceleration energy ratio (%) of the corresponding vehicle 100 among the energy consumption ratio (%) to the central server 200.

Furthermore, the controller 130 of each vehicle 100 may analyze the energy consumption distribution of the corresponding vehicle 100, determine regenerative energy, determine a regenerative energy ratio (%) of the corresponding vehicle 100 from the determined regenerative energy, and transmit the determined regenerative energy ratio (%) to the central server 200.

Accordingly, the central server 200 may be configured to determine the average value of the acceleration energy ratios ("acceleration" in city bus average and metropolitan bus average) for each route using the acceleration energy ratios received from the vehicles driving on each route, as shown in the left graphs of FIG. 6 and FIG. 7.

The left graph of FIG. 6 shows an example in which the average value (%) of the acceleration energy ratios of the city buses driving on city routes is 70%, and the left graph of FIG. 7 shows an example in which the average value (%) of the acceleration energy ratios of the metropolitan buses driving on metropolitan routes is 32%.

For reference, if the controller 130 of each vehicle 100 is provided to further transmit, in addition to the acceleration energy ratio (%) and the regenerative energy ratio (%), an air resistance energy consumption ratio ("aerodynamic", %), a rolling resistance energy consumption ratio ("rolling", %), a gradient energy ratio ("gradient", %), and an auxiliary machinery energy consumption ("AUX", %) to the central server 200, the central server 200 may also determine the average value of each of these energy consumption ratios (%) received from each vehicle 100.

That is, as shown in the left graphs of FIG. 6 and FIG. 7, the average values of the air resistance energy consumption ratios ("aerodynamic" in city bus average and metropolitan bus average), the average values of the rolling resistance energy consumption ratios ("rolling" in city bus average and metropolitan bus average), the average values of the gradient energy ratios ("gradient" in city bus average and metropolitan bus average), and the average values of the auxiliary machinery energy consumption ratios ("AUX" in city bus average and metropolitan bus average) may also be obtained.

Meanwhile, in an exemplary embodiment of the present disclosure, the central server 200 performs the above process of analyzing the energy consumption distribution, and then performs a process of setting the accelerator pedal sensitivity of the vehicle 100 of the selected driver who is using the excessive level of the acceleration energy based on results of the analysis process.

In an exemplary embodiment of the present disclosure, the process of setting the accelerator pedal sensitivity of the vehicle 100 of the selected driver who is using the excessive level of the acceleration energy includes a process of tuning an accelerator pedal map of the corresponding vehicle 100. Here, the accelerator pedal map is a map in which the correlation between accelerator pedal input values (APS value, %) and torques is defined, and is provided for each vehicle 100.

In a general vehicle, the accelerator pedal map is a map used to determine a demand torque corresponding to the driver's accelerator pedal input value (%), and the demand torque determined from the accelerator pedal map by the controller 130 of the vehicle 100 may be used to generate and output a motor torque command to control operation of the motor, which is the driving device 150 to drive the vehicle 100.

In an exemplary embodiment of the present disclosure, the process of tuning the accelerator pedal map includes a process of generating, by the central server 200, a torque correction map based on the acceleration energy ratio (%) of the vehicle 100 of the driver who is excessively using the acceleration energy, the average acceleration energy ratio (%) of a driving route to which the vehicle 100 of the driver who is excessively using the acceleration energy belongs, and the peak value average of the accelerator pedal input values (APS values) of the vehicle 100 of the driver who is using the excessive level of the acceleration energy, a process of transmitting the torque correction map generated by the central server 200 to the vehicle 100 of the driver who is using the excessive level of the acceleration energy through communication to input the torque correction map into the controller 130 of the vehicle 100, and a process of correcting, by the controller 130 of the vehicle 100 of the driver who is using the excessive level of the acceleration energy, map values (torque values) of the current accelerator pedal map using the torque correction map received and input from the central server 200.

In an exemplary embodiment of the present disclosure, the torque correction map is information used to customize and tune the acceleration characteristics of the vehicle 100 of the driver who is using the excessive level of the acceleration energy to suit the acceleration driving tendency of the driver (who is using the excessive level of the acceleration energy), and is information used to perform accelerator pedal sensitivity personalization for the vehicle 100 of the driver who is using the excessive level of the acceleration energy.

Figure 8:
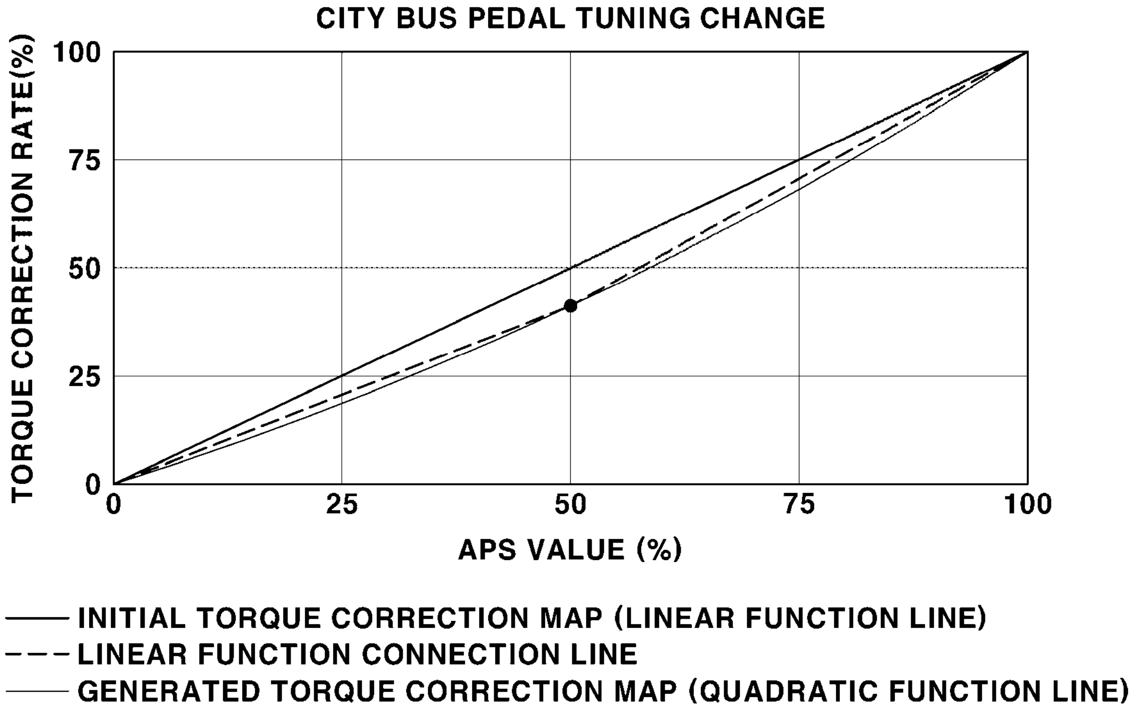
FIG. 8 is a diagram explaining a method of generating a torque correction map for city buses that mainly drive on city routes in an exemplary embodiment of the present disclosure.
Figure 9:
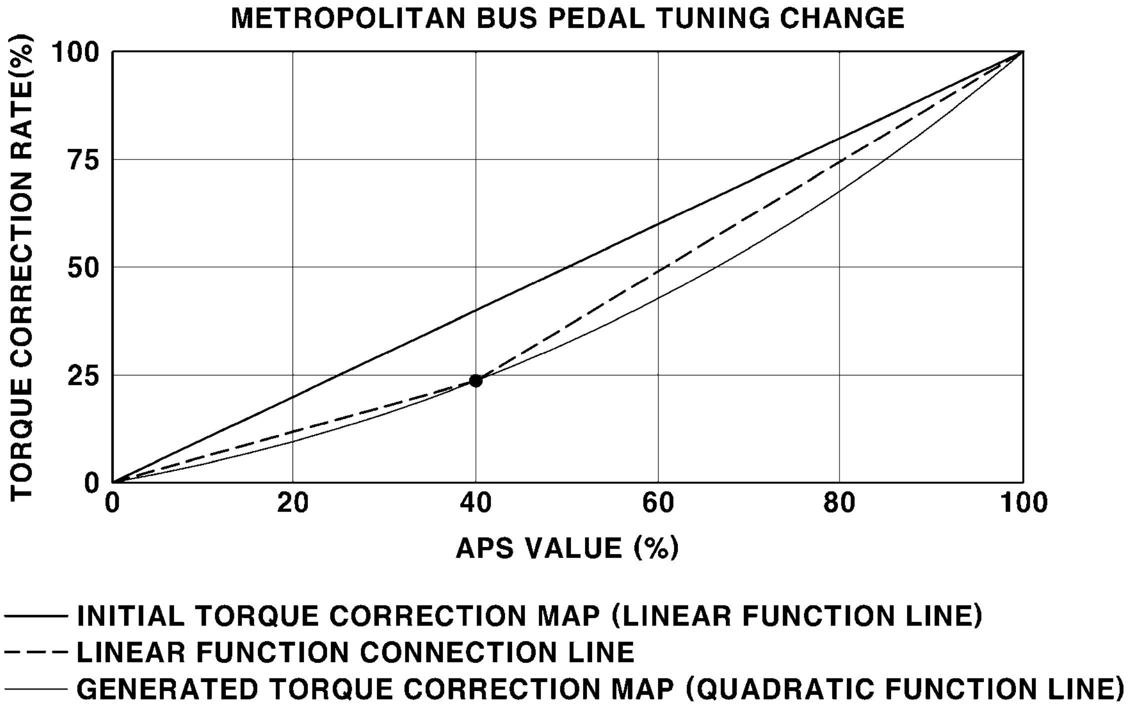
FIG. 9 is a diagram explaining a method of generating a torque correction map for metropolitan buses that mainly drive on metropolitan routes in an exemplary embodiment of the present disclosure.

The torque correction map may be a map in which the correlation between accelerator pedal input values (APS value, %) and torque correction rates (%) is defined (see FIG. 8 and FIG. 9). The torque correction map is generated by the central server 200 and transmitted to the vehicle 100, and accordingly, the vehicle 100 receives the torque correction map from the central server 200 through the communication unit 140 and then inputs the torque correction map into the controller 130.

Here, the vehicle 100 is the vehicle 100 of the driver who is using the excessive level of the acceleration energy, selected by the central server 200, and the controller 130 is the controller 130 of the vehicle 100 of the driver who is using the excessive level of the acceleration energy.

In an exemplary embodiment of the present disclosure, when tuning the accelerator pedal map, the controller 130 of the vehicle 100 of the driver who is using the excessive level of the acceleration energy may tune the accelerator pedal map by correcting the map values of the accelerator pedal map depending on torque correction rate (%) of the received torque correction map, i.e., the torque value for each accelerator pedal input value (%) of the current accelerator pedal map using the torque correction rate (%) for each accelerator pedal input value (%) of the torque correction map.

At the present time, the map values (torque values) of the entire accelerator pedal input value section of the current accelerator pedal map may be corrected by multiplying the torque value corresponding each accelerator pedal input value of the current accelerator pedal map by the torque correction rate (%) corresponding to the same accelerator pedal input value in the entire accelerator pedal input value section of the torque correction map.

That is, the map values of the accelerator pedal map before tuning are corrected so that a torque value for each accelerator pedal input value, which is the map value of the accelerator pedal map after tuning, is obtained by multiplying the torque value for each accelerator pedal input value, which is the map value of the accelerator pedal map before tuning, by the torque correction rate (%) for the same accelerator pedal input value of the torque correction map. This will be summarized in Mathematical Expression 4 below.

Torque value for each accelerator pedal input value of accelerator pedal map after tuning=Torque value for each accelerator pedal input value of accelerator pedal map before tuning×Torque correction rate (%) for each accelerator pedal input value of torque correction map [Mathematical Expression 4]

FIG. 8 is a diagram explaining a method of generating a torque correction map for city buses that mainly drive on city routes in an exemplary embodiment of the present disclosure, and FIG. 9 is a diagram explaining a method of generating a torque correction map for metropolitan buses that mainly drive on metropolitan routes in an exemplary embodiment of the present disclosure. FIG. 8 illustrates the torque correction map for city buses, and FIG. 9 illustrates the torque correction map for metropolitan buses.

The central server 200 generates the torque correction map in which the correlation between the accelerator pedal input values (APS value, %) and the torque correction rates (%) is defined for the vehicle 100 of the selected driver who is using the excessive level of the acceleration energy, as shown in these figures. In the torque correction map, the accelerator pedal input value (APS value, %) is set from the minimum value of 0% to the maximum value of 100%, and the torque correction rate is also set from the minimum value of 0% to the maximum value of 100%.

To generate the torque correction map, the central server 200 utilizes the acceleration energy ratio (%) of the vehicle 100 of the driver who is using the excessive level of the acceleration energy, the average acceleration energy ratio (%) of the driving route to which the vehicle 100 of the driver who is excessively using the corresponding acceleration energy belongs, and the peak value average (%) of the accelerator pedal input values of the vehicle 100 of the driver who is using the excessive level of the acceleration energy. Here, the peak value average (%) of the accelerator pedal input values may be the maximum accelerator pedal input value that the corresponding driver mainly utilizes when accelerating the vehicle 100.

In the generating of the torque correction map, the central server 200 first determines a ratio of the average acceleration energy ratio (%) of the corresponding route to the acceleration energy ratio (%) of the vehicle 100 of the driver who is using the excessive level of the acceleration energy, i.e., (the average acceleration energy ratio (%) of the route)/(the acceleration energy ratio (%) of the vehicle of the driver who is using the excessive level of the acceleration energy), as a derating factor.

Furthermore, the central server 200 generates a linear function line (linear graph) that linearly connects two coordinate points, which are a coordinate point including coordinates of a preset minimum value (e.g., 0%) of accelerator pedal input values and a corresponding torque correction rate (e.g., 0%) and a coordinate point including coordinates of a preset maximum value (e.g., 100%) of the accelerator pedal input values and a corresponding torque correction rate (e.g., 100%), respectively, in the coordinate system of the torque correction map in which the horizontal axis represents the accelerator pedal input value (APS value, %) and the vertical axis represents the torque correction rate (%).

Next, as shown in FIG. 6, FIG. 7, FIG. 8 and FIG. 9, the torque correction rate, which is a value of the linear function corresponding to the peak value average of the accelerator pedal input values of the corresponding driver in the torque correction map of the corresponding vehicle 100, is derated using the above derating factor.

At the present time, the value (torque correction rate value) of the linear function corresponding to the peak value average of the accelerator pedal input values in the torque correction map is multiplied by the derating factor, and thus, the value of the linear function is derated.

Accordingly, the torque correction rate corresponding to the peak value average of the accelerator pedal input values may be determined, and in the instant case, a value obtained by multiplying the value of the linear function by the derating factor so that the value of the linear function is reduced by the derating factor is finally determined as the torque correction rate corresponding the peak value average of accelerator pedal input values in the torque correction map.

Furthermore, as shown in FIG. 6, FIG. 7, FIG. 8 and FIG. 9, the value (0%) of the linear function corresponding to the minimum value (0%) of the accelerator pedal input values in the torque correction map is maintained as the minimum torque correction rate, and the value (100%) of the linear function corresponding to the maximum value (100%) of the accelerator pedal input values in the torque correction map is maintained as the maximum torque correction rate.

As a result, torque correction rates for the entire section of the accelerator pedal input values in the torque correction map may be determined using the minimum value (0%) of the accelerator pedal input values and the corresponding value (0%, the minimum torque correction rate) of the linear function, the peak value average of the accelerator pedal input values and the corresponding torque correction rate (the value obtained by multiplying the value of the linear function corresponding to the peak value average by the derating factor), and the maximum value (100%) of the accelerator pedal input values and the corresponding value (100%, the maximum torque correction rate) of the linear function in the torque correction map.

At the present time, as shown in FIG. 6, FIG. 7, FIG. 8 and FIG. 9, in the coordinate system of the torque correction map in which the horizontal axis represents the accelerator pedal input value (APS value, %) and the vertical axis represents the torque correction rate (%), values of the quadratic function for the accelerator pedal input values in the entire section of the accelerator pedal input values may be finally determined as torque correction rates (%).

That is, the line of a quadratic function with the above three coordinate points, i.e., the coordinate point having coordinates of the minimum value (0%) of the accelerator pedal input values and the minimum torque correction rate, which is the corresponding value of the linear function, the coordinate point having coordinates of the peak value average of the accelerator pedal input values and the corresponding torque correction rate (the value obtained by multiplying the value of the linear function corresponding to the peak value average by the derating factor), and the coordinate point having coordinates of the maximum value (100%) of the accelerator pedal input values and the maximum torque correction rate, which is the corresponding value of the linear function, may be represented on the coordinate system of the torque correction map.

Accordingly, the line of the quadratic function for the accelerator pedal input values (APS values) becomes a new torque correction map, and the values of the quadratic function become map values of the torque correction map, that is, the torque correction rate depending on the accelerator pedal input value. As a result, through the above process, the central server 200 may be configured to generate a torque correction map for the driver who is using the excessive level of the acceleration energy.

Referring to the example of FIG. 6 and FIG. 8, because the acceleration energy ratio of city bus A, which is the vehicle of a driver using the excessive level of the acceleration energy, is 85%, and the average acceleration energy ratio of city buses driving on a corresponding route is 70%, the derating factor may be determined as "70/85=0.82".

Furthermore, because the peak value average of driver's accelerator pedal input values of city bus A is 50%, as shown in FIG. 8, a value of 41% obtained by multiplying a value of 50% of a linear function corresponding to an accelerator pedal input value of 50% in the torque correction map by the derating factor of 0.82 ("50%×0.82=41%") is determined as a new torque correction rate corresponding to the accelerator pedal input value of 50%.

Therefore, in the torque correction map in which the horizontal axis represents the accelerator pedal input value (APS value) and the vertical axis represents the torque correction rate (%), the line of a quadratic function with three coordinate points, i.e., a coordinate point having coordinates of the minimum value (0%) of accelerator pedal input values and the corresponding minimum torque correction rate (0%), a coordinate point having coordinates of the peak value average (50%) of the accelerator pedal input values and a corresponding new torque correction rate (41%), and a coordinate point having coordinates of the maximum value (100%) of the accelerator pedal input values and the corresponding maximum torque correction rate (100%) is generated.

As described above, the line of the quadratic function generated by the central server 200 becomes the torque correction map of city bus A, which is the vehicle of the driver using the excessive level of the acceleration energy, and the value of the quadratic function for the accelerator pedal input value in the torque correction map becomes the derated final torque correction rate.

The line (straight line) of a linear function from 0%, which is the minimum value of the accelerator pedal input values, to 50%, which is the peak value average of the accelerator pedal input values, and the line (straight line) of a linear function from 50%, which is the peak value average of the accelerator pedal input values 0%, to 100%, which is the maximum value of the accelerator pedal input values, may be respectively generated and then the two consecutive lines of the linear functions may be used as the torque correction map that defines the torque correction rate depending on each accelerator pedal input value, but it is desirable to generate the torque correction map by deriving the trend line of the quadratic function for the entire section of the accelerator pedal input values, as described above.

As shown in FIG. 6, FIG. 7, FIG. 8 and FIG. 9, the line of the linear function before derating, the line of the linear function after derating, and the line of the quadratic function, which is the trend line after derating, are illustrated together, and it may be confirmed that the line of the linear function before derating is a straight line graph with a slope of 1, and the line of the linear function after derating is a broken line graph with different slopes in two sections.

The reason for which the torque correction rates of the final torque correction map are defined as the trend line of the quadratic function for the accelerator pedal input values is to prevent occurrence of a sense of incongruity due to discontinuity in the slope of the peak value average of the accelerator pedal input values and to prevent occurrence of a situation in which the driver depresses the accelerator pedal further due to the sense of incongruity, rendering tuning meaningless.

Referring to the example of FIG. 7 and FIG. 9, because the acceleration energy ratio of metropolitan bus A, which is the vehicle of a driver using the excessive level of the acceleration energy, is 55%, and the average acceleration energy ratio of metropolitan buses driving on a corresponding route is 32%, the derating factor may be determined as "32/55=0.58".

Furthermore, because the peak value average of driver's accelerator pedal input values of metropolitan bus A is 40%, as shown in FIG. 9, a value of 23.2% obtained by multiplying a value of 40% of a linear function corresponding to an accelerator pedal input value of 40% in the torque correction map by the derating factor of 0.58 ("40%×0.58=23.2%") is determined as a new torque correction rate corresponding to the accelerator pedal input value of 40%.

Therefore, in the torque correction map in which the horizontal axis represents the accelerator pedal input value (APS value) and the vertical axis represents the torque correction rate (%), the line of a quadratic function with three coordinate points, i.e., a coordinate point having coordinates of the minimum value (0%) of accelerator pedal input values and the corresponding minimum torque correction rate (0%), a coordinate point having coordinates of the peak value average (40%) of the accelerator pedal input values and a corresponding new torque correction rate (23.2%), and a coordinate point having coordinates of the maximum value (100%) of the accelerator pedal input values and the corresponding maximum torque correction rate (100%) is generated.

As described above, the line of the quadratic function generated by the central server 200 becomes the torque correction map of metropolitan bus A, which is the vehicle of the driver using the excessive level of the acceleration energy, and the value of the quadratic function for the accelerator pedal input value in the torque correction map becomes the derated final torque correction rate.

The above torque correction map generated by the central server 200 is transmitted to the corresponding vehicle 100 and used by the controller 130 of the vehicle 100 to correct and tune the existing accelerator pedal map.

At the present time, the controller 130 of the vehicle 100 multiplies the torque value, which is the map value of the existing accelerator pedal map corresponding to each accelerator pedal input value, by the torque correction rate of the torque correction map corresponding to each accelerator pedal input value, correcting and tuning the existing accelerator pedal map by the torque correction rate.

In the examples of FIG. 6, FIG. 7, FIG. 8 and FIG. 9, the controller 130 of the vehicle 100 of the driver using the excessive level of the acceleration energy may receive an average acceleration energy ratio of the corresponding route from the central server 200, and then determine an expected energy efficiency increase rate based on the acceleration energy ratio and regenerative energy ratio of the vehicle 100 and an average acceleration energy ratio of the corresponding route.

Subsequently, the controller 130 of the vehicle 100 may be configured for controlling operation of the display of the input/output unit 120 to display a message recommending execution of the acceleration personalization mode to the driver with reference to the determined expected energy efficiency increase rate.

For example, in the case of city bus A illustrated in FIG. 6 and FIG. 8, because the acceleration energy ratio may be reduced from 85% to 70% by tuning the accelerator pedal map, and based on the reduction in the acceleration energy ratio and the regenerative energy ratio (40%), the expected energy efficiency increase rate considering regeneration may be determined as "(85−70)×(1−0.4)=9%".

Accordingly, the controller 130 of the vehicle 100 may display the following message recommending execution of the acceleration personalization mode through the display of the vehicle 100 with reference to the expected energy efficiency increase rate of 9%.

"When applying the acceleration personalization mode based on the customer's driving data, fuel costs may be reduced by approximately 9%. Would you like to experience the acceleration personalization mode?

YES or NO (Please select the acceleration mode you want after experiencing it.)"

Here, the acceleration personalization mode is a mode in which acceleration control of a vehicle is performed by a corrected and tuned accelerator pedal map. When the driver selects execution of the acceleration personalization mode with reference to the displayed message (selecting "YES"), the acceleration personalization mode is executed, and the controller 130 is configured to determine a demand torque corresponding to a real-time accelerator pedal input value (APS value) using the corrected and tuned accelerator pedal map, and then is configured to control operation of the motor, which is the driving device 150, using the determined demand torque.

If the driver selects "NO", the acceleration personalization mode is not executed. Furthermore, after the vehicle 100 is initially driven in the acceleration personalization mode, the controller 130 may display a message inquiring about maintenance of the acceleration personalization mode through the display of the input/output unit 120.

At the present time, the driver may select maintenance of the acceleration personalization mode with reference to the displayed message, or select return to the previous acceleration mode in which acceleration control is performed using the previous accelerator pedal map, after the acceleration personalization mode is finished.

In the present way, the exemplary embodiments of the present disclosure have been described in detail. The above-described system for personalizing acceleration of vehicles may customize accelerator pedal sensitivity of each vehicle for a driver based on driving data to improve energy efficiency of the vehicle and achieve safe driving, and implement acceleration control and acceleration personalization depending on the driver.

It is possible to reliably derive energy distribution for each vehicle and each driving route, and it is possible to reliably derive major energy distributions for vehicle characteristics (design, drivetrain characteristics, etc.) and driving routes (city, metropolitan, and complex routes, etc.). Furthermore, major energy consumptions for each vehicle and each driving route may be reduced. Furthermore, collected data may be applied to various controls to improve energy efficiency.

Furthermore, because driver-customized acceleration control is possible, vehicle energy efficiency may be improved, and furthermore, safe driving may be promoted. An acceleration pattern for each driver may be analyzed through driving data analysis, and accelerator pedal sensitivity of each vehicle of a driver who accelerates excessively compared to average drivers may be adjusted. If the accelerator pedal sensitivity is adjusted, the energy efficiency of the vehicle may be improved.

As is apparent from the above description, a system for personalizing acceleration of vehicles according to an exemplary embodiment of the present disclosure may customize accelerator pedal sensitivity of each vehicle for a driver based on driving data to improve energy efficiency of the vehicle and achieve safe driving, and implement acceleration control and acceleration personalization depending on the driver.

Furthermore, the term related to a control device such as "controller", "control apparatus", "control unit", "control device", "control module", "control circuit", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory.

The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for personalizing acceleration of vehicles, the system comprising:
- a driving information detection unit disposed in each vehicle;
- a controller of each vehicle configured to output driving data of each vehicle obtained based on information collected while driving of each vehicle, wherein the collected information includes vehicle driving information detected by the driving information detection unit connected to the controller;
- a communication unit disposed in each vehicle and connected to the controller; and
- a central server configured to determine a driver who is using an excessive level of acceleration energy of a vehicle, based on the driving data of the vehicles, received from each vehicle through the communication unit, generate information to perform acceleration personalization of the vehicle of the determined driver who is using the excessive level of the acceleration energy, and transmit the generated information to the controller of the vehicle of the driver who is using the excessive level of the acceleration energy,
- wherein the controller in the vehicle of the driver who is using the excessive level of the acceleration energy tunes accelerating characteristics of the vehicle to perform the acceleration personalization, based on the information to perform the acceleration personalization received from the central server through the communication unit.

2. The system of claim 1, wherein the driving data comprises vehicle speed information, driver's accelerator pedal input information, and acceleration energy information.

3. The system of claim 2, wherein the vehicle speed information comprises an average vehicle speed and a standard deviation of vehicle speeds of each vehicle.

4. The system of claim 2, wherein the driver's accelerator pedal input information comprises an accelerator pedal input value peak value average obtained by averaging peak values of driver's accelerator pedal input values.

5. The system of claim 2, wherein the acceleration energy information is an acceleration energy ratio defined as a ratio of acceleration energy consumed for vehicle acceleration to total energy consumption while driving of each vehicle.

6. The system of claim 5, wherein the total energy consumption is a sum of air resistance energy consumption defined as energy consumed due to air resistance, rolling resistance energy consumption defined as energy consumed due to rolling resistance, gradient energy consumed due to gradient resistance, the acceleration energy consumed for the vehicle acceleration, and auxiliary machinery energy consumption comprising energy consumed for air-conditioning, cooling of parts or devices, and operation of electrical parts.

7. The system of claim 2,
- wherein the acceleration energy information is an acceleration energy ratio defined as a ratio of acceleration energy consumed for vehicle acceleration to total energy consumption while driving of each vehicle, and
- wherein the central server is provided to:
  - categorize the vehicles depending on driving routes based on the vehicle speed information; and
  - determine the driver who is using the excessive level of the acceleration energy among vehicle drivers depending on the driving routes using the acceleration energy ratios of the vehicles categorized depending on the driving routes.

8. The system of claim 7, wherein the vehicle speed information comprises an average vehicle speed and a standard deviation of vehicle speeds of each vehicle.

9. The system of claim 8, wherein the central server is provided to, in categorizing the vehicles depending on the driving routes, compare the average vehicle speed received from each vehicle with a set reference speed, classify a vehicle whose average speed exceeds the reference speed as a vehicle driving in a high-speed driving section, and classify a vehicle whose average vehicle speed is lower than or equal to the reference vehicle as a vehicle driving in a city.

10. The system of claim 9, wherein the central server is provided to:
- determine a relative standard deviation of the vehicle speeds of each vehicle from the average vehicle speed and the standard deviation of the vehicle speeds of each vehicle; and
- in categorizing the vehicles depending on the driving routes, further classify vehicles driving in high-speed driving sections as vehicles driving on a plurality of driving routes by comparing the relative standard deviation of the vehicles driving in the high-speed driving sections with a threshold value.

11. The system of claim 7, wherein the driver's accelerator pedal input information comprises an accelerator pedal input value peak value average obtained by averaging peak values of driver's accelerator pedal input values, and wherein the central server is provided to generate a torque correction map as the information for performing the acceleration personalization, based on the acceleration energy ratio of the vehicle of the determined driver who is using the excessive level of the acceleration energy, an average acceleration energy ratio obtained by averaging acceleration energy ratios of vehicles categorized as a driving route to which the driver who is using the excessive level of the acceleration energy belongs, and the accelerator pedal input value peak value average of the driver who is using the excessive level of the acceleration energy.

12. The system of claim 11, wherein the torque correction map is a map configured so that a correlation between the accelerator pedal input values and torque correction rates is defined therein, and wherein the central server is provided to:

determine a ratio of the average acceleration energy ratio to the acceleration energy ratio of the vehicle of the driver who is using the excessive level of the acceleration energy as a derating factor; and generate the torque correction map using the determined derating factor and the accelerator pedal input value peak value average.

13. The system of claim 12, wherein the central server is provided to, in a coordinate system of the torque correction map:

generate a line of a linear function configured to linearly connect two coordinate points having, as coordinate values, a predetermined minimum value of the accelerator pedal input values and a predetermined torque correction rate value corresponding to the minimum value, and a predetermined maximum value of the accelerator pedal input values and a predetermined torque correction rate value corresponding to the maximum value; and generate a line of a quadratic function configured to pass through a coordinate point having, as coordinate values, the accelerator pedal input value peak value average, and a torque correction rate value obtained by multiplying a value of the linear function corresponding to the accelerator pedal input value peak value average by the derating factor, and the two coordinate points connected by the line of the linear function, as the torque correction map.

14. The system of claim 12, wherein the controller in the vehicle of the driver who is using the excessive level of the acceleration energy is provided to, in performing the acceleration personalization, tune an accelerator pedal map of the vehicle using the torque correction map received from the central server, and wherein the accelerator pedal map is a map configured so that a correlation between the accelerator pedal input values and torques is defined therein to determine a driver's demand torque value depending on the accelerator pedal input value.

15. The system of claim 14, wherein the controller in the vehicle of the driver who is using the excessive level of the acceleration energy is provided to, in tuning the accelerator pedal map, correct the torque of the accelerator pedal map corresponding to each accelerator pedal input value before tuning using the torque correction rate of the torque correction map corresponding to each accelerator pedal input value.

16. The system of claim 7, wherein the controller in the vehicle of the driver who is using the excessive level of the acceleration energy is provided to:

determine an expected energy efficiency increase rate based on the acceleration energy ratio of the vehicle of the driver who is using the excessive level of the acceleration energy, an average acceleration energy ratio obtained by averaging acceleration energy ratios of vehicles categorized as a driving route to which the driver who is using the excessive level of the acceleration energy belongs, and a regenerative energy ratio of the vehicle of the driver who is using the excessive level of the acceleration energy; and control an input/output unit of the vehicle to display a message configured to recommend performance of the acceleration personalization together with the determined expected energy efficiency increase rate.

17. The system of claim 16, wherein the regenerative energy ratio of the vehicle is defined as a ratio of regenerative energy generated by a motor to a sum of total energy consumption while driving of the vehicle and the regenerative energy.

18. The system of claim 17, wherein the total energy consumption is a sum of air resistance energy consumption defined as energy consumed due to air resistance, rolling resistance energy consumption defined as energy consumed due to rolling resistance, gradient energy consumed due to gradient resistance, the acceleration energy consumed for the vehicle acceleration, and auxiliary machinery energy consumption comprising energy consumed for air-conditioning, cooling of parts or devices, and operation of electrical parts.

19. The system of claim 1, wherein the driving data comprises an acceleration energy ratio defined as a ratio of acceleration energy consumed for vehicle acceleration to total energy consumption while driving of each vehicle, and wherein the controller is provided to determine the acceleration energy as a value obtained by dividing wheel-based acceleration energy, obtained based on information collected while a driver operates an accelerator pedal while driving of each vehicle, by drivetrain efficiency.

20. The system of claim 19, wherein the controller is provided to determine the wheel-based acceleration energy as a value obtained by subtracting a sum of air resistance energy consumption, rolling resistance energy consumption, and gradient energy consumed due to air resistance, rolling resistance, and gradient resistance, respectively, while the driver operates the accelerator pedal, from motor driving energy determined while driving of each vehicle.

* * * * *